United States Patent [19]

Yant

[11] 4,162,001
[45] Jul. 24, 1979

[54] FREE RING SYNCHRONIZER HAVING OPPOSITELY ACTING SPRING MEANS

[75] Inventor: Kenneth B. Yant, Oregon, Ohio

[73] Assignee: Dana Corporation, Toledo, Ohio

[21] Appl. No.: 852,124

[22] Filed: Nov. 16, 1977

[51] Int. Cl.² ............................................. F16D 23/06
[52] U.S. Cl. .................................. 192/53 E; 192/53 F
[58] Field of Search ............................ 192/53 E, 53 F

[56] References Cited
U.S. PATENT DOCUMENTS

| | | | |
|---|---|---|---|
| 3,221,851 | 12/1965 | Vandervoort | 192/53 E |
| 3,419,120 | 12/1968 | Stott | 192/53 E |
| 3,692,163 | 9/1972 | Ruettinger | 192/53 F |
| 3,695,403 | 10/1972 | Eastwood | 192/53 E |
| 3,739,890 | 6/1973 | Nolli | 192/53 E |

Primary Examiner—Allan D. Herrmann
Attorney, Agent, or Firm—Robert M. Leonardi

[57] ABSTRACT

A free ring synchronizer is provided with improved resilient means for circumferentially biasing a pair of axially spaced friction rings in opposite directions. The resilient means is a coil spring mounted within a shiftable coupling collar interposed between the friction rings. The coil spring includes radially extending legs for engaging oppositely extending pins which are fixed to the friction rings and pass through openings in the shiftable coupling collar. Coacting blocking surfaces are provided on the pins and in the coupling collar openings and are releasably held in contact by the reaction of the legs against the pins.

6 Claims, 4 Drawing Figures

FREE RING SYNCHRONIZER HAVING OPPOSITELY ACTING SPRING MEANS

BACKGROUND OF THE INVENTION

The present invention relates to synchronizing devices in general and more particularly to a synchronizing device of the free ring type.

Prior art synchronizing devices of the free ring type consist of a pair of friction rings which are spaced apart and have a shiftable coupling collar disposed therebetween. The friction rings include pins rigidly connected to each ring and adapted to pass through suitable openings in the coupling collar. The pins and openings have coacting blocking surfaces maintained in contact by resilient means to insure that the blocking action occurs prior to the shifting of the coupling collar in either direction.

In known prior art devices, the resilient means have taken different forms and also have been located in a number of different positions with respect to the elements that make up the synchronizing device. For example, some devices have resilient means located in adjacent gear elements of the transmission and adapted to react against at least one of the friction rings to provide the desired result. Others have been directly associated with one or more of the elements of the synchronizing device. These devices require special mounting arrangements in which the pins are modified, or in which one or both of the friction rings are modified to achieve the desired operation. In addition, constructions of this type are difficult to assemble. Extra care must be taken to assure that the resilient means do not pop-out as the unit is preassembled. The cost of replacement due to wear is another undesirable factor to a vehicle owner and operator.

The present invention is intended to solve the above problems by providing a synchronizing device of the free ring type wherein a single resilient means is supported in the coupling collar for biasing the spaced friction rings in opposite circumferential direction.

Another object of the invention is to provide an improved resilient means for a free ring synchronizer which is simple in design and easily replaceable in the event of failure.

SUMMARY OF THE INVENTION

The above objects are achieved by providing an improved torsion spring having a coiled center section and radially outwardly directed legs. In the preferred embodiment, the torsion spring is disposed in openings in the shiftable coupling collar so as to have the outwardly directed legs resiliently engage one of the pins associated with each of the friction rings thereby circumferentially biasing the same in opposite directions with respect to the coupling collar.

Other objects and advantages of the invention will become apparent from a reading of the following description when taken in conjunction with the accompanying drawings.

DESCRIPTION OF THE PREFERRED EMBODIMENT

Figure 1:
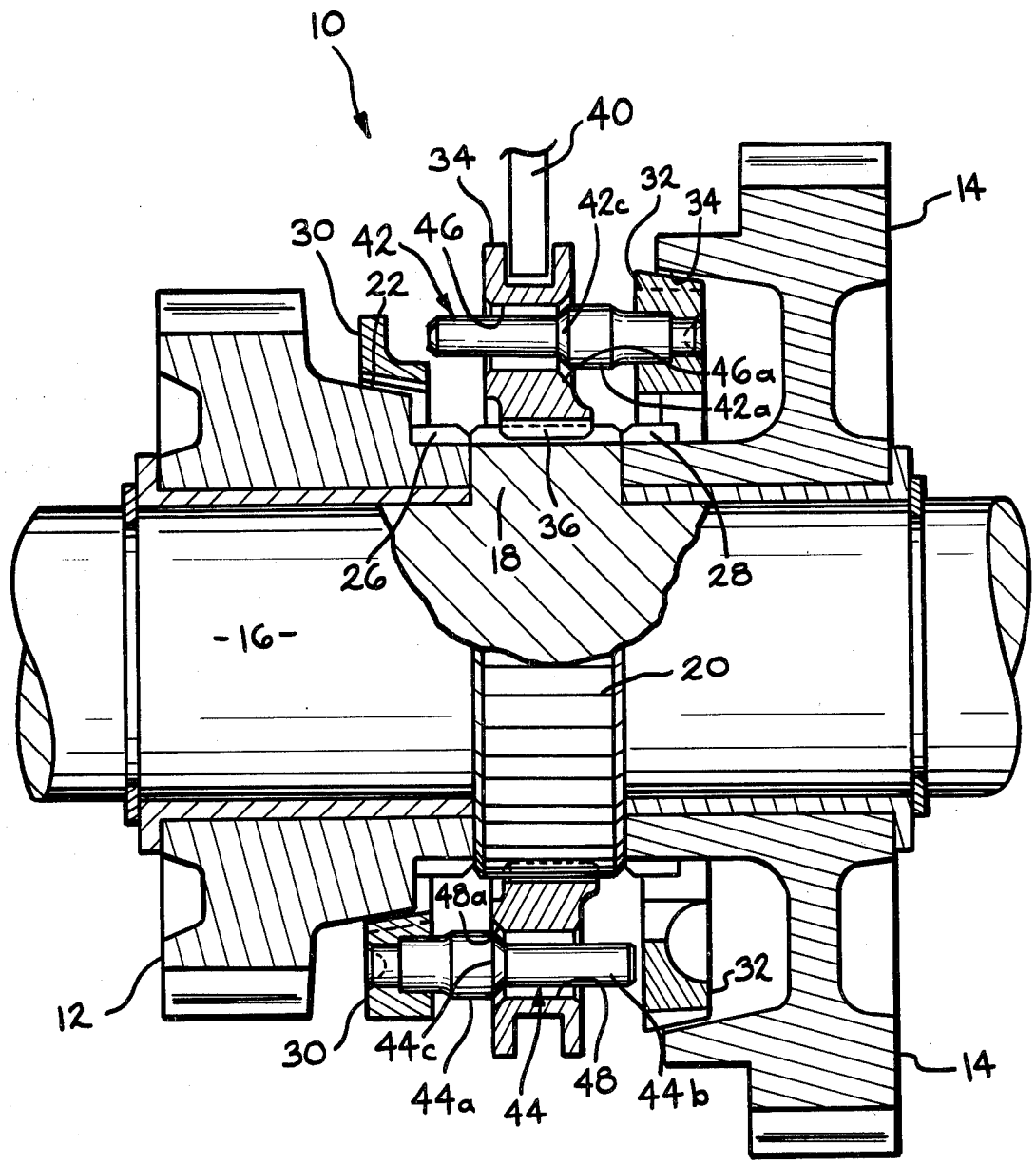
FIG. 1 is a longitudinal sectional view taken along line 1—1 of FIG. 2 of a synchronizing device associated with transmission gearing and embodying the principles of the present invention.

Referring to FIG. 1, a pin type range synchronizing device is shown generally at 10 for cooperating with a pair of axially spaced gears 12 and 14 of a constant mesh change speed gear unit. Gears 12 and 14 are rotatably mounted on an output shaft 16 so as to be located on opposite sides of an enlarged diameter hub 18 which has longitudinal extending external splines 20. Preferably, the hub 18 is constructed as an integral part of the shaft 16 so as to be rotatable therewith.

Gears 12 and 14 are mounted on the shaft 16 in a well-known manner so as to be rotatable relative thereto while being axially fixed thereon. Each gear is provided with friction and positive clutch portions adapted to cooperate with mating friction and positive clutch portions of the synchronizing device 10. The friction portions serve to establish a preliminary frictional connection between the respective gear and shaft so that the relative speeds of the positive clutch portions will be prevented from engaging until synchronization is effected.

More particularly the friction clutch portions of each gear 12 and 14 consist of tapered friction elements 22 and 24 and the positive clutch portions include external clutch teeth 26 and 28 respectively. Clutch teeth 26 and 28 are constructed on the axially inner ends of gears 12 and 14 so as to be adjacent to and correspond in shape to external splines 20 of hub 18 of the shaft 16.

The friction clutch portion of the synchronizing device 10 comprises a pair of cone type friction rings 30 and 32 while the positive clutch portion is an axially shiftable coupling collar 34 having axially extending internal splines 36. The splines 36 mate with external splines 20 of the shaft hub 18 and are axially movable relative thereto into selective engagement with either clutch teeth 26 on gear 12 or clutch teeth 28 on gear 14. The axial movement of the coupling collar 34 is accomplished by a conventional operator controlled shift fork 40, partially shown.

Shift 40 is operable to move the coupling collar 34 from a neutral position, as shown in FIG. 1, in opposite directions into either of two operative positions. In one direction, the splines 36 engage clutch teeth 26 to drivingly connect the gear 12 to shaft 16 and, in the opposite direction, splines 36 engage clutch teeth 28 to connect the gear 14 to shaft 16.

Figure 2:
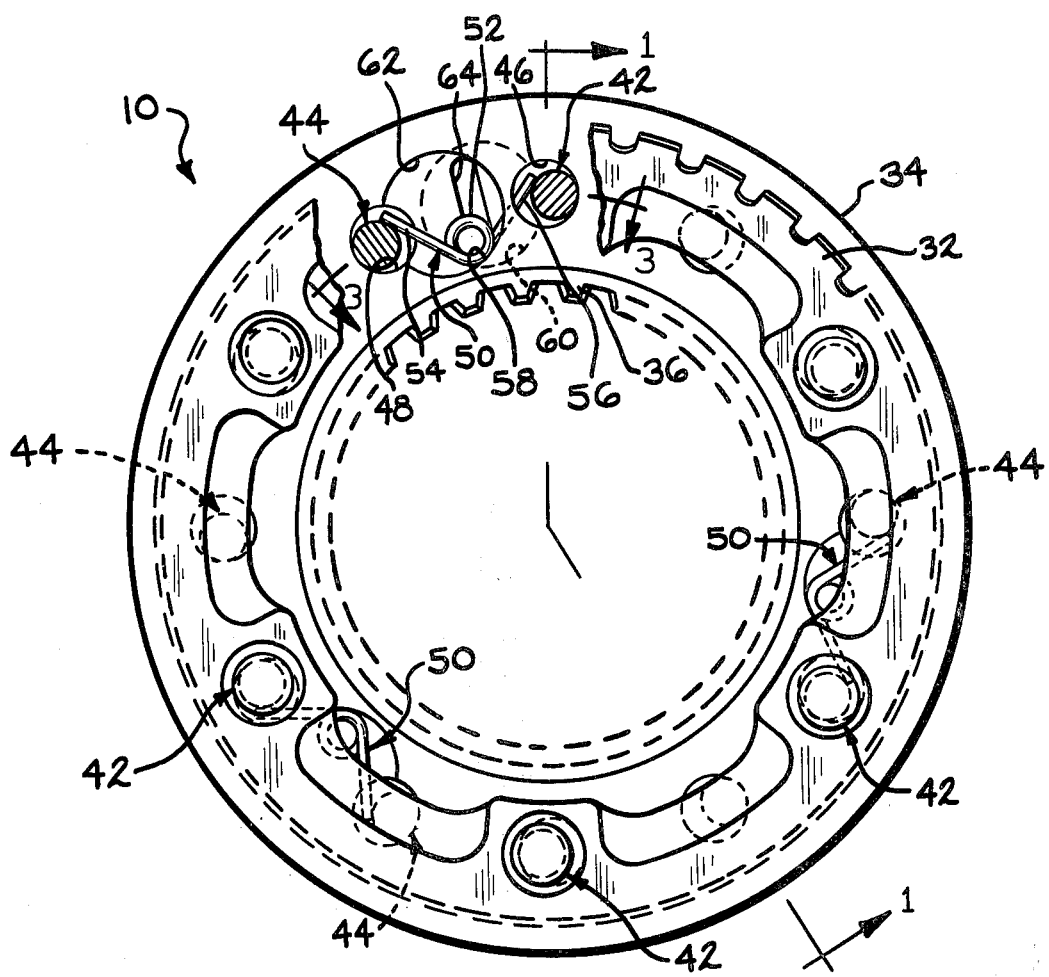
FIG. 2 is a partial broken away end view of the synchronizing device shown in FIG. 1 and viewed from the right with the gearing and shaft removed for clarity.

Prior to this positive coupling action, as indicated before, it is essential that the relative rotational speeds of the respective gear and shaft are approximately synchronized so that a clash-free shift can be made. This is accomplished by providing a releasable connection between the coupling collar 34 and friction rings 30 and 32. To this end, each friction ring 30 and 32 is provided with a plurality of axially extending pins 42 and 44 respectively. The pins 42 and 44 are alternatingly and equally circumferentially spaced around the rings 30 and 32, as best seen in FIG. 2. As illustrated in FIG. 1, each pin 42 and 44 extends through an opening 46 and 48, respectively, in the coupling collar 34 toward the opposing ring.

Referring in greater detail to FIG. 1, the individual pins 42 and 44 have one end fixed to its associate ring in a well-known manner. Each pin 42 and 44 is constructed with an enlarged diameter cylindrical portion 42a and 44a, and a reduced diameter cylindrical elongated stem portion 42b and 44b, respectively. Enlarged diameter portions 42a and 44a and cooperating openings 46 and 48 are suitably constructed to enable passage of the portions 42a and 44a through the openings 46 and 48 when synchronization is achieved.

In order to permit the coupling collar 34 to effect a preliminary engagement between the friction rings 30 and 32 and friction elements 22 and 24 prior to positive clutch engagement, coacting blocking means are formed on the pins 42 and 44 and in the mating openings 45 and 48. The blocking means are designed to releasably block engagement of the positive clutch portions while they are rotating out of synchronism. The blocking means are constructed and arranged so as to be operatively associated with the side of the coupling collar adjacent the friction ring and adapted to provide the preliminary frictional contact. For example, with reference to FIG. 1, in connection with friction ring 30 located on the left of the coupling collar 34, the blocking means includes a frusto-conical inwardly tapered cam shoulder 44c on each pin 44 and a complimentary outwardly tapered frusto-conical cam shoulder 48a on the left side of opening 48. Similarly, with respect to the right friction ring 32, the blocking means is shown including a frusto-conical inwardly tapered cam shoulder 42c on each pin 42 and a complimentary outwardly tapered frusto-conical cam shoulder 46a on the right side of opening 46.

It is desirable to provide means to insure correct positioning of the blocking shoulders prior to any movement of the coupling collar in either direction from its neutral position. This means is normally of a resilient nature and serves to maintain the blocking surface in initial contact with its mating friction surface. Additionally, during a shift, the resilient means effects an increased and relatively heavy pressure engagement of the friction elements to force synchronization prior to engagement of the positive clutch elements.

Figure 3:
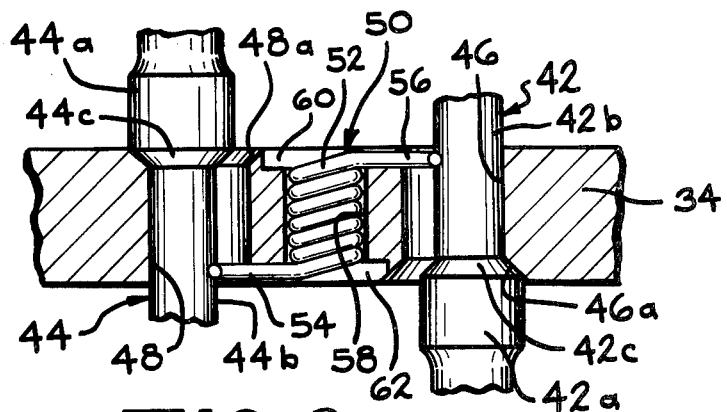
FIG. 3 is a section view of the mounting opening taken along line 3—3 of FIG. 2.
Figure 4:
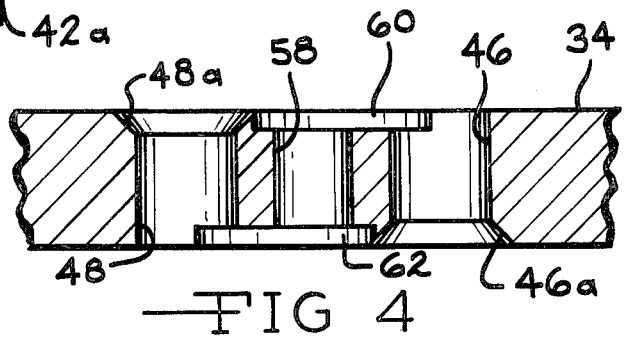
FIG. 4 is a view of the coupling collar of FIG. 3 with the resilient means removed to more clearly show the details of the mounting openings.

In the presently preferred embodiment of the invention, the resilient means is a double acting torsion spring indicated generally at 50. Three equally spaced springs are shown in FIG. 2. Referring specifically to FIG. 3, it will be seen that each torsion spring 50 comprises a coiled center section 52 and integral oppositely acting first and second radially outwardly extending legs 54 and 56. To properly locate the spring 50 within the coupling collar 34, a mounting opening 58 is constructed through the coupling collar 34 intermediate a pair of pin openings 46 and 48. Annular counterbores 60 and 62 are provided on opposite faces of the coupling collar 34 and cooperate with the opening 58. As seen in FIG. 2, the counterbores 60 and 62 are constructed in such a manner as to wholly encircle the mounting opening 58 and extend partially into the pin openings 46 and 48, respectively. These counterbores 60 and 62 serve as guides for operating portions of the opposed legs 54 and 56 respectively of spring 50. In order to permit springs 50 to be inserted within the opening 58, a radially outwardly extending slot 64, as seen in FIG. 2, provided for passage of one of the spring legs 54 or 56, depending upon the direction the spring is to be assembled.

In assembled relation, as illustrated in FIG. 3, and with the coupling collar 34 in its neutral position, the spring legs 54 and 56 engage reduced diameter stem portions 42b and 44b of pins 42 and 44, respectively. The spring coil 52 biases the legs 54 and 56 in opposite directions. The legs 54 and 56 are forced apart, thereby urging the rings 30 and 34 in opposite circumferential directions. The pins 42 and 44 are therefore displaced to opposite sides of their respective openings and the blocking shoulders 42c and 46a, and 44c and 48a, are biased into frictional engagement to effect proper alignment of the parts in preparation for a shift in either direction.

From the foregoing it will be seen that a free ring synchronizer has been shown and described which accomplishes the objects and advantages previously set forth. This has been achieved by provision of a simple resilient means that is wholly supported within the shiftable coupling member of a free ring type synchronizer. The mounting arrangement within the coupling collar is designed to permit easy initial assembly of the resilient means and convenient replacement if required. Further, shipping as a subassembly is also easier because the resilient means is carried by the coupling collar, thereby alleviating the problem of damage or loss to the individual resilient means.

While a single preferred embodiment of the invention has been disclosed, it will be understood that variations or modifications may occur to those skilled in the art without departing from the spirit and scope of the invention as defined in the following claims.

What is claimed is:
1. A synchronizing device comprising:
first and second axially spaced friction rings,
an axially shiftable coupling collar disposed between said friction rings, said coupling collar having spaced first and second openings and guide means located between said openings,
a pin fixed to and extending axially from each of said friction rings, each of said pins passing through one of said first and second openings,
a torsion spring disposed in said guide means having a coiled center section and oppositely directed leg portions radially extending from each end of said coiled center section and yieldingly engaging said pins.
2. A synchronizing device according to claim 1 wherein said guide means includes an axially extending opening in said collar for receiving said coiled center section and relieved portions connecting opposite ends of said axially extending opening with said first and second openings.
3. A synchronizing device according to claim 2 wherein said axially extending opening is annular and said relieved portions are annular offset counterbores partially extending into said first and second openings.
4. A synchronizing device comprising:
a first friction ring having at least one axially extending pin secured thereto,
a second friction ring axially spaced from said first friction ring having at least one axially extending pin secured thereto,
an axially shiftable collar disposed between said friction rings, said collar defining a pair of openings,
said pin on said first friction ring extending through one of said openings and said pin on said second friction ring extending through said other opening, coating blocking means on said pins and in said openings, a torsion spring supported by said shiftable collar between said pair of openings having a coiled center section and oppositely acting leg portions extending radially from each end of said coiled center section.

5. A synchronizing device according to claim 4 wherein said collar has a plurality of circumferentially spaced sets of first and second openings each of said friction rings having a plurality of pins passing through alternate openings of said spaced sets.

6. A synchronizing device according to claim 5 wherein guide means is provided in said collar between each set of said first and second openings, said coiled center section of said torsion spring mounted in said guide means and said legs yieldably engaging said plurality of pins on each of said friction rings to urge said coacting blocking means into frictional engagement.

* * * * *